(12) United States Patent
Jensen

(10) Patent No.: US 7,406,136 B2
(45) Date of Patent: Jul. 29, 2008

(54) CHANNEL SELECT FILTER AND APPLICATIONS THEREOF

(75) Inventor: Henrik T. Jensen, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 771 days.

(21) Appl. No.: 10/911,874

(22) Filed: Aug. 5, 2004

(65) Prior Publication Data
US 2006/0029170 A1 Feb. 9, 2006

(51) Int. Cl.
*H03K 9/00* (2006.01)
(52) U.S. Cl. .................. 375/316; 375/229
(58) Field of Classification Search ............ 375/316, 375/229
See application file for complete search history.

(56) References Cited
U.S. PATENT DOCUMENTS 6,885,752 B1* 4/2005 Chabries et al. ............ 381/321
2003/0125005 A1* 7/2003 Lee ........................... 455/302

* cited by examiner

*Primary Examiner*—Mohammad Ghayour
*Assistant Examiner*—Juan A Torres
(74) *Attorney, Agent, or Firm*—Garlick Harrison & Markison; Timothy W. Markison; Kevin L. Smith

(57) ABSTRACT

A channel select filter having channel equalization includes a first low pass filter stage, a gain stage, a subtraction module, and a second low pass filter stage. The first low pass filter stage is operably coupled to filter input signals to produce first low pass filtered signals. The gain stage is operably coupled to adjust gain of the input signals to produce gained input signals. The subtraction module is operably coupled to subtract the first low pass filtered signals from the gain input signals to produce first stage signals. The second low pass filter stage is operably coupled to filter the first stage signals to produce channel selected signals.

18 Claims, 18 Drawing Sheets channel select filter 132 receiver section 68 digital demodulator 116 channel select filter 132 channel select filter 132

FIG. 18
differentiator
FIG. 19
integrator
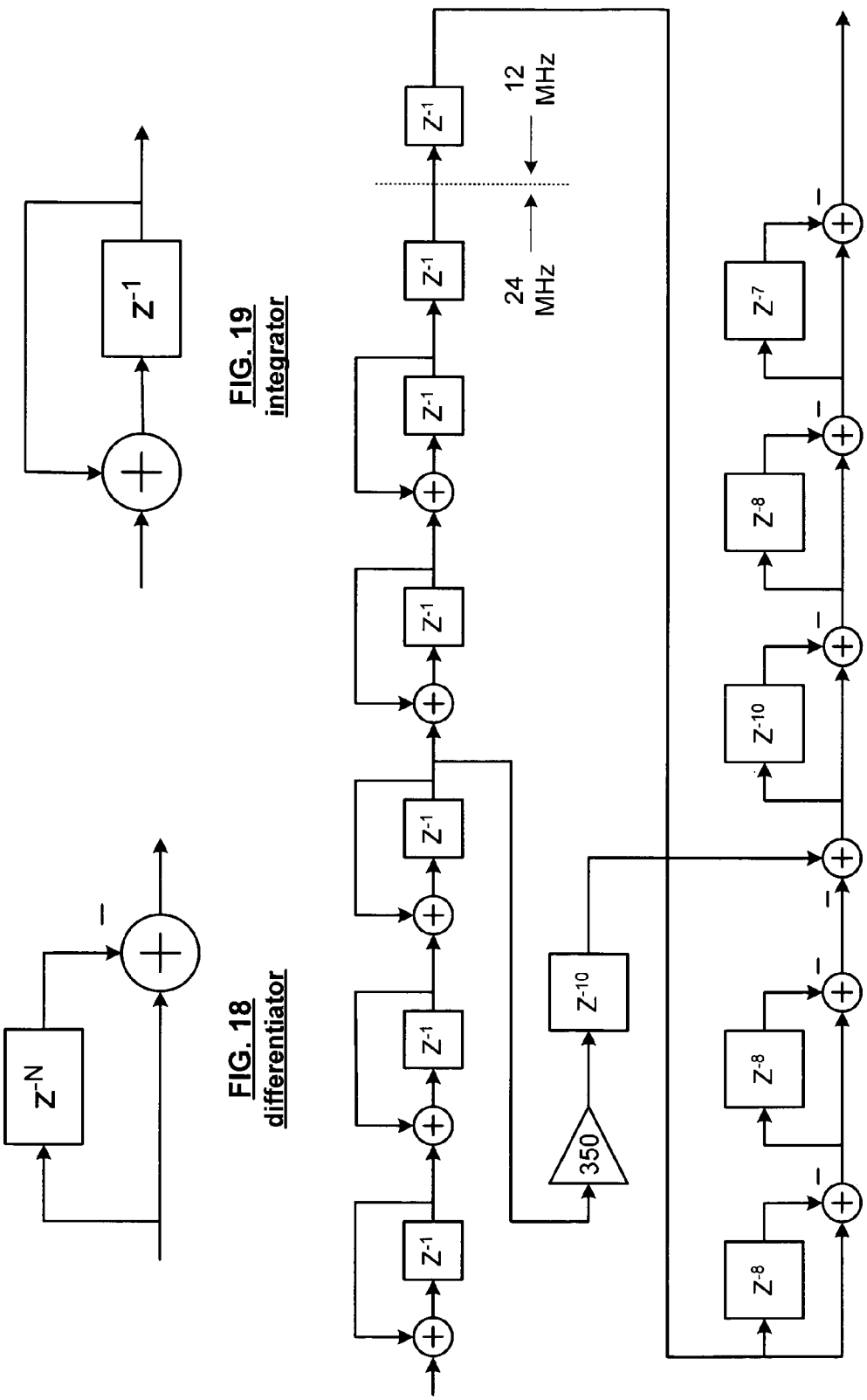
FIG. 20
channel select filter 132 channel select filter 132 channel select filter 132 channel select filter 132 channel select filter 132 channel select filter 132

CHANNEL SELECT FILTER AND APPLICATIONS THEREOF

BACKGROUND OF THE INVENTION

1. Technical Field of the Invention

This invention relates generally to wireless communication systems and more particularly to filtering within wireless communication devices.

2. Description of Related Art

The drive towards systems-on-chip solutions for wireless communications applications continues to replace traditionally analog signal processing tasks with digital processing to exploit the continued shrinkage in die area and reduction in power consumption of digital CMOS technology. The idea is to relax analog signal processing requirements and relegate more processing to the digital domain where, in addition to the reduced silicon area requirements, the processing is less sensitive to process and temperature variations. For example, this trend is observed in RF receivers where the received signal is digitized early in the receiver chain using a high dynamic range analog-to-digital converter (ADC); typically a delta-sigma ADC. Much of the dynamic range required by the receiver is then accounted for in the digital domain, which is generally achieved by ensuring that a sufficient number of bits in the nodes of the signal processing path.

Common to wireless applications is the strict requirement of minimal power consumption. This is, of course, due to the fact that devices are battery powered and the time between battery replacements or battery recharge directly relates to consumer product satisfaction. Thus, two main goals drive the development of wireless communications devices: achieving the highest possible radio performance and the lowest possible power consumption.

Since an increasing amount of the signal processing of the modern radio is relegated to the digital domain, many efforts have gone into developing hardware efficient, low power digital signal processing algorithms that perform the processing necessary in both the receiver and transmitter sections of the radio. Probably the most important task in the digital signal processing of radios is the task of filtering. Filtering is used to remove undesired noise and interfering signals in order to provide high signal-to-noise ratio (SNR) in the processing path.

A typical top-level block diagram of a radio receiver intended for Bluetooth applications is shown in FIG. 1. In this radio, the RF signal is amplified using a low noise amplifier (LNA), and translated to a 2 MHz intermediate frequency (IF) using a pair of mixers. An analog filter partially filters out undesired interferers and the signal is then digitized using a high dynamic range delta-sigma ADC ($\Delta\Sigma$ADC). Digital processing is then used to down-convert the signal to DC, filter out noise and interferers, and finally extract the desired signal.

FIG. 2 shows the top-level block diagram of the digital IF demodulator of FIG. 1. An anti-aliasing filter reduces the sample rate, where after a direct digital frequency synthesizer (DDFS) de-rotates the signal to baseband. Sharp digital low pass filters (LPFs) with carefully selected bandwidths are employed to remove interferers and noise. The subsequent blocks perform signal demodulation.

The digital LPFs of FIG. 2, which are often referred to as "channel select" filters, play an extremely important role in the demodulation performance of the receiver. These filters must be designed to be very frequency selective while maintaining linear phase response in order not to cause distortion of the received signal. Employing digital filters with non-linear phase response is possible, but undesirable, since this would generally require compensation in later processing stages. Such compensation typically requires a substantial amount of digital processing.

A popular class of filters for channel-select filtering is finite impulse response (FIR) filters because of their inherent linear phase response. As the name implies, an FIR filter, H(z), can be represented in the discrete-time domain with a finite sequence of coefficients as in the following general form of the Z-transform of the impulse response $$H(z) = h_0 + h_1 z^{-1} + \ldots + h_N z^{-N} = \sum_{i=0}^{N} h_i z^{-i}, \quad (1)$$

In addition to performing frequency selective filtering, FIR filters are typically also used to introduce magnitude equalization in the signal path of the receiver. Magnitude equalization is the task of compensating for the in-band magnitude droop caused by the preceding analog filtering stages. Typically, analog filtering imposes some degree of in-band droop in the signal path in order to provide adequate attenuation of close-in interferers. This in-band droop represents signal distortion, and may lead to degraded receiver performance. Thus, for optimal receiver performance, this magnitude distortion must be compensated for in the digital domain by some equalization mechanism. The result is that the combined magnitude response of the analog and digital filtering as closely as possible resembles that of an ideal "brick-wall" filter.

A disadvantage of FIR filters is that they typically require a large number of multiplications and additions to perform the narrowband frequency selective low pass filtering and magnitude equalization needed in high-performance receivers. Defined as the standard measure of hardware complexity of FIR filters, the number of multiplications and additions needed per clock cycle is directly related to power consumption and required chip die area. Thus, for low power and low cost radios, it is imperative to reduce the hardware complexity of the digital filters as much as possible.

For example, in the wireless Bluetooth standard, the channel spacing is 1 MHz. Thus, in the Bluetooth receiver of FIG. 1, the low pass equivalent bandwidth of the combined analog and digital filtering is around 500 kHz to ensure appropriate signal integrity prior to signal demodulation. In order to satisfy the interferer tolerance specifications of Bluetooth, the combined filtering is such that Adjacent Channel Interferers (ACI) and other undesired signals are strongly rejected by the total filtering in the signal path. Quantization noise of the $\Delta\Sigma$ADC in the receive path should also be rejected by digital filtering in order to ensure optimal signal-to-noise ratio (SNR). For example, FIG. 3 shows a typical idealized filter mask for the total signal filtering of the receiver. This filtering is thus the combined effect of analog and digital filters of the receiver.

FIG. 4 shows an example low pass equivalent magnitude response of the analog BPF shown in FIG. 1. This filter typically does not possess a very sharp roll-off characteristic, but rather has a moderate filtering capability. This is due to the fact that it is desirable to employ analog filters that are simple to implement and that analog filters with sharp roll-off typically cause significant phase distortion. On the other hand, the filter roll-off has to be sufficient to filter out high-powered interferers and undesired RF signals that would otherwise cause the ADC to mal-function due to overload. FIG. 5 is a close-up of FIG. 4, showing the magnitude response in the frequency range 0-1.5 MHz. Notice the in-band droop of the magnitude response.

As mentioned, ideally the in-band magnitude response of the total signal filtering path is "flat". In practice, however, the in-band droop of the BPF shown in FIG. 5 causes magnitude distortion of the received signal, resulting in non-optimal receiver characteristics. The measurable effects are increased bit error rates and/or reduced robustness to interferers. To avoid loss of receiver performance, it is desirable to compensate, or "equalize", the distortions encountered in the analog filtering by incorporating some compensation scheme in the subsequent digital signal processing.

Therefore, a need exists for a hardware efficient filter that incorporates channel magnitude equalization, is low-power, and/or is capable of performing narrowband frequency selective low pass and equalization filtering without the use of a large number of multipliers.

BRIEF SUMMARY OF THE INVENTION

The channel select filter and applications thereof of the present invention substantially meets these needs and others. In one embodiment, a channel select filter having channel equalization includes a first low pass filter stage, a gain stage, a subtraction module, and a second low pass filter stage. The first low pass filter stage is operably coupled to filter input signals to produce first low pass filtered signals. The gain stage is operably coupled to adjust gain of the input signals to produce gained input signals. The subtraction module is operably coupled to subtract the first low pass filtered signals from the gain input signals to produce first stage signals. The second low pass filter stage is operably coupled to filter the first stage signals to produce channel selected signals.

In another embodiment, a radio receiver includes a low noise amplifier, a down conversion module, an analog to digital converter, and a digital demodulator. The digital demodulator includes a baseband conversion module, a channel select filter, and a data recovery module. The low noise amplifier is operably coupled to amplify inbound radio frequency (RF) signals to produce amplified inbound RF signals. The down conversion module is operably coupled to convert the amplified inbound RF signals into low intermediate frequency (IF) signals. The analog to digital converter is operably coupled to convert the low IF signals into digital low IF signals. The digital demodulator is operably coupled to convert the digital low IF signals into inbound symbols. The baseband conversion module is operably coupled to convert the digital low IF signals into digital baseband signals. The channel select filter operably coupled to filter the digital baseband signals to produce channel selected signals. The data recovery module is operably coupled to produce the inbound symbols from the channel selected signals. The channel select filter includes a first low pass filter stage, a gain stage, a subtraction module, and a second low pass filter stage. The first low pass filter stage is operably coupled to filter the digital baseband signals to produce first low pass filtered signals. The gain stage is operably coupled to adjust gain of the digital baseband signals to produce gained digital baseband signals. The subtraction module is operably coupled to subtract the first low pass filtered signals from the gain digital baseband signals to produce first stage signals. The second low pass filter stage is operably coupled to filter the first stage signals to produce the channel selected signals.

BRIEF DESCRIPTION OF THE SEVERAL VIEWS OF THE DRAWINGS

FIG. 18 is a schematic block diagram of a digital differentiator;

FIG. 19 is a schematic block diagram of a digital integrator;

FIG. 20 is a schematic block diagram of an implementation of the channel select filter of FIG. 17;

DETAILED DESCRIPTION OF THE INVENTION

Figure 6:
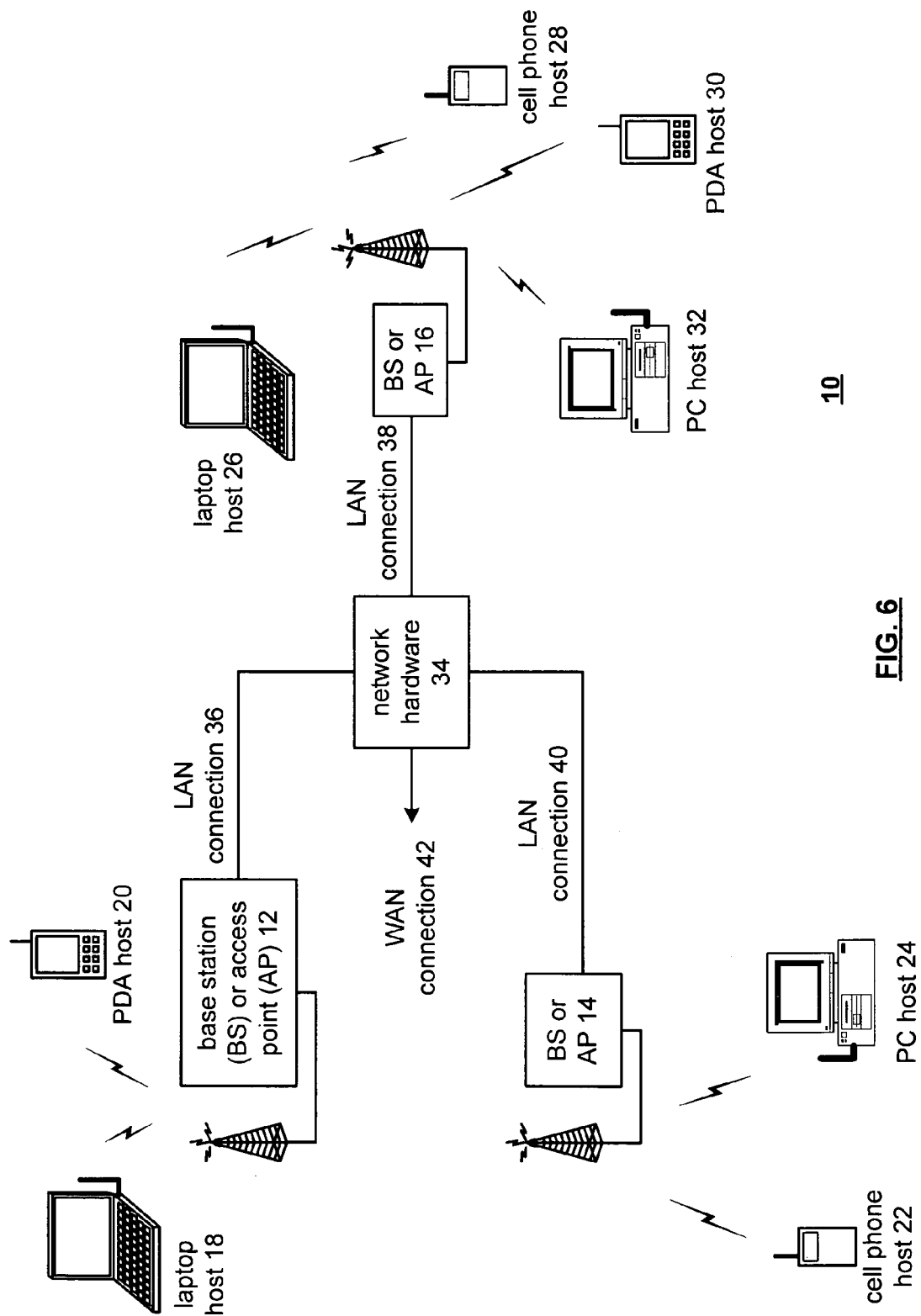
FIG. 6 is a schematic block diagram of a wireless communication system in accordance with the present invention.

FIG. 6 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 7.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 7:
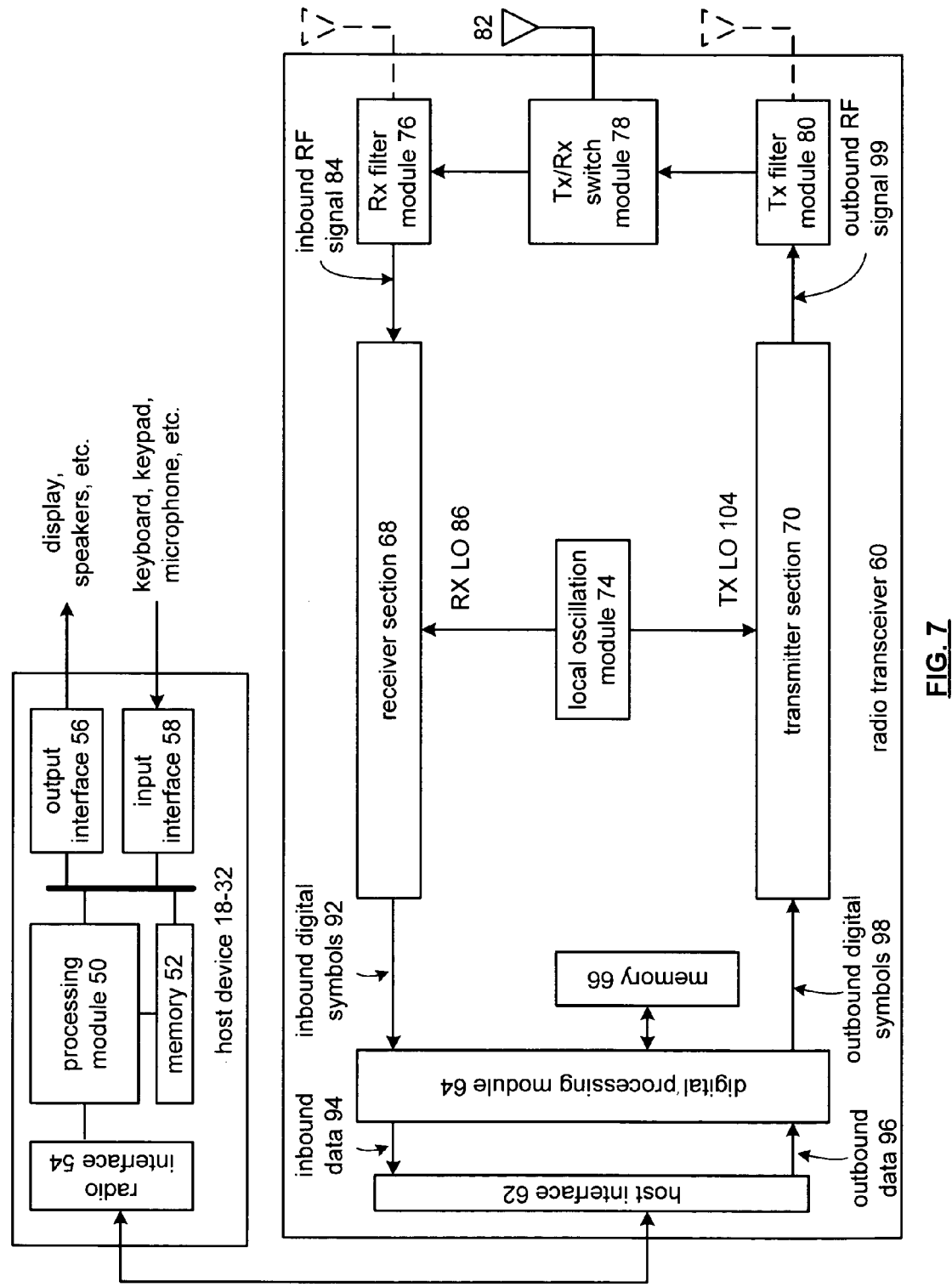
FIG. 7 is a schematic block diagram of a wireless communication device in accordance with the present invention.

FIG. 7 is a schematic block diagram illustrating a wireless communication device that includes the host device 18-32 and an associated radio transceiver 60. For cellular telephone hosts, the radio transceiver 60 is a built-in component. For personal digital assistants hosts, laptop hosts, and/or personal computer hosts, the radio transceiver 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio transceiver 60. For data received from the radio transceiver 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio transceiver 60 via the radio interface 54.

Radio transceiver 60 includes a host interface 62, digital processing module 64, memory 66, a receiver section 68, a transmitter section 70, a local oscillation module 74, a receiver (RX) filter module 76, a transmit/receive (TX/RX) switch module 78, a TX filter module 80, and an antenna 82. The antenna implementation will depend on the particular standard to which the wireless communication device is compliant.

The digital processing module 64, in combination with operational instructions stored in memory 66, execute digital receiver functions and digital transmitter functions. The digital receiver functions include one or more of, but are not limited to, digital intermediate frequency to baseband conversion, demodulation, constellation demapping, decoding, and/or descrambling. The digital transmitter functions include one or more of, but are not limited to, scrambling, encoding, constellation mapping, modulation, and/or digital baseband to IF conversion. The digital processing module 64 may be implemented using an individual processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio transceiver 60 receives outbound data 96 from the host device via the host interface 62. The host interface 62 routes the outbound data 96 to the digital processing module 64, which processes the outbound data 96 in accordance with a particular wireless communication standard (e.g., IEEE 802.11, Bluetooth, et cetera) to produce outbound digital symbols 98. The outbound digital symbols 98 may be binary data, frequency shift keying (FSK) data, 2-bit phase shift keying (PSK) data, 3-bit PSK data, etc.

The transmitter section 70 converts the outbound digital symbols 98 into RF signals 99 in accordance with a transmit local oscillation (TX LO) 104. The transmitter filter module 80 filters the RF signals 99, which are routed to the antenna 82 via the Tx/Rx switch module 78. The antenna 82 transmits the outbound RF signals 99 to a targeted device such as a base station, an access point and/or another wireless communication device.

The radio transceiver 60 also receives inbound RF signals 84 via the antenna 82, which were transmitted by a base station, an access point, or another wireless communication device. The antenna 82 provides the inbound RF signals 84 to the receiver filter module 76 via the Tx/Rx switch module 78. The Rx filter module 76 bandpass filters the inbound RF signals 84 and provides them to the receiver section 68, which will be described in greater detail with reference to FIGS. 8 and 9.

The receiver section 68 converts the inbound RF signals 84 into inbound digital symbols 92, which may be binary data, PSK data, and/or FSK data. The digital processing module 64 converts the inbound digital symbols 92 into inbound data 94. The host interface 62 provides the inbound data 94 to the host device 18-32 via the radio interface 54.

As one of average skill in the art will appreciate, the wireless communication device of FIG. 7 may be implemented using one or more integrated circuits. For example, the host device may be implemented on one integrated circuit, the digital processing module 64 and memory 66 may be implemented on a second integrated circuit, and the remaining components of the radio transceiver 60, less the antenna 86, may be implemented on a third integrated circuit. As an alternate example, the radio transceiver 60 may be implemented on a single integrated circuit. As yet another example, the processing module 50 of the host device and the digital processing module 64 may be a common processing device implemented on a single integrated circuit. Further, the memory 52 and memory 66 may be implemented on a single integrated circuit and/or on the same integrated circuit as the common processing modules of processing module 50 and the digital processing module 64.

Figure 8:
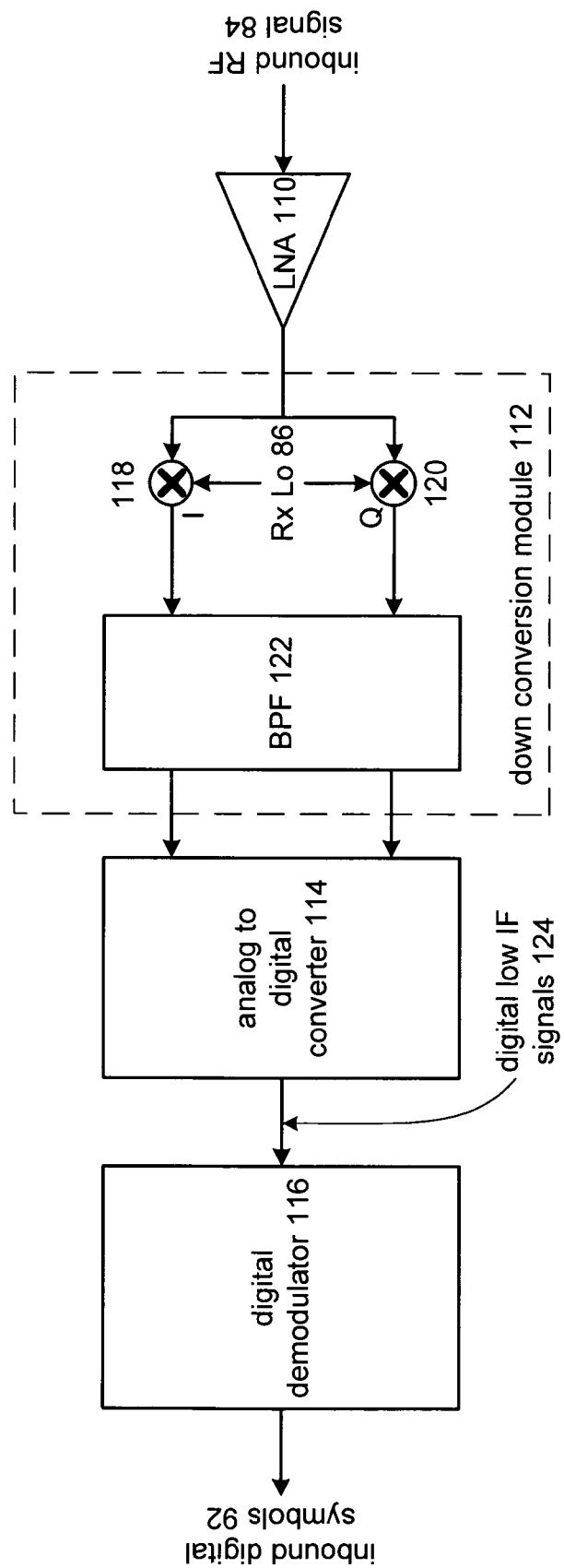
FIG. 8 is a schematic block diagram of a receiver section in accordance with the present invention.

FIG. 8 is a schematic block diagram of the receiver section 68 that includes a low noise amplifier 110, a down conversion module 112, an analog to digital converter 114, and a digital demodulator 116. The down conversion module 112 includes mixers 118 and 120 and an analog bandpass filter (BPF) 122.

In operation, the low noise amplifier 110 amplifies the inbound RF signals 84 to produce amplified inbound RF signals. The amount of amplification of the low noise amplifier depends on the received signal strength of the inbound RF signals 84 and the dynamic range of the analog to digital converter 114. The mixers 118 and 120 of the down conversion module 112 mixes the amplified inbound RF signals with an in-phase (I) and quadrature (Q) components of the receiver local oscillation 86, respectively, to produce in-phase mixed signals and quadrature mixed signals.

The analog bandpass filter 122 substantially passes the frequency difference component of the in-phase and quadrature mixed signals unattenuated and attenuates the frequency sum component of the in-phase and quadrature mixed signals to produce low intermediate frequency (IF) signals. The analog to digital converter 114 converts the low IF signals from the analog domain to the digital domain to produce digital low IF signals 124.

The digital demodulator 116, which will be described in greater detail with reference to FIGS. 9-29, converts the digital low IF signals 124 into the inbound symbols 92, which may be binary data, PSK data, and/or FSK data.

Figure 9:
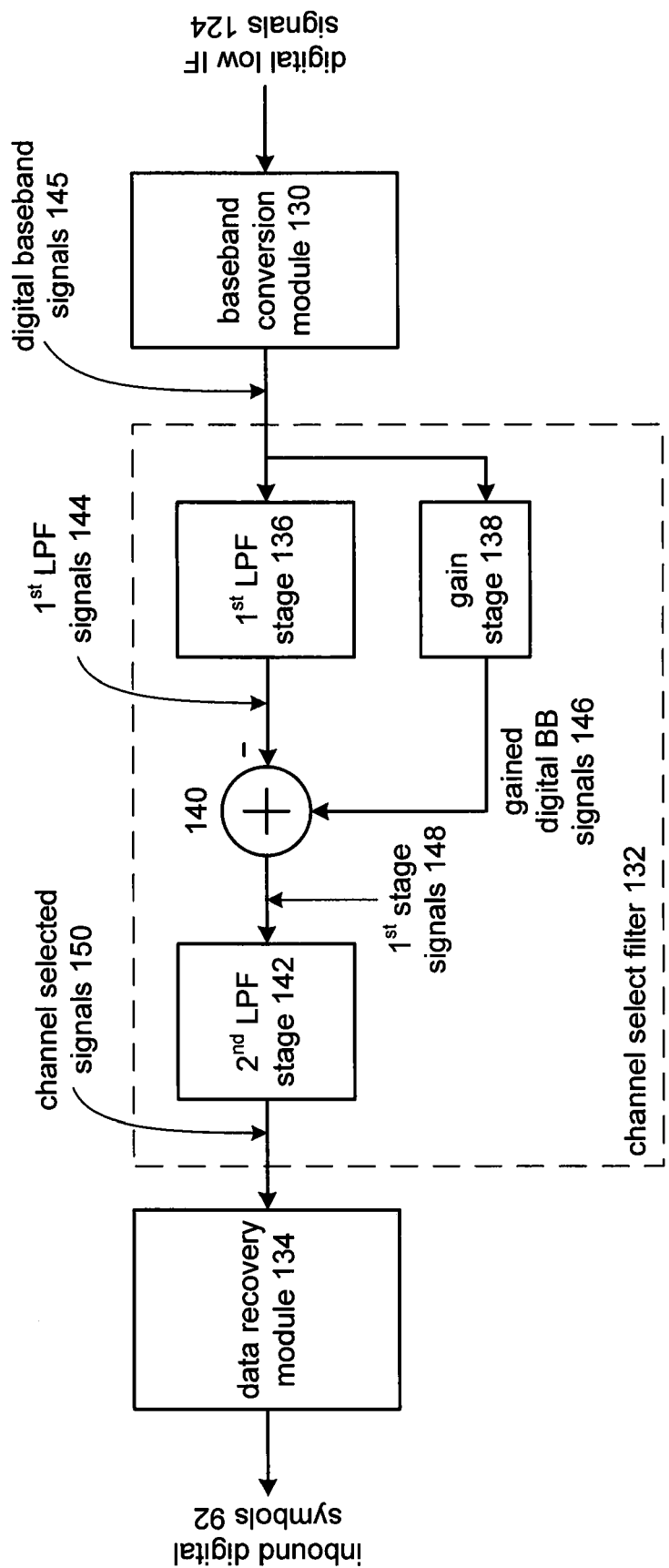
FIG. 9 is a schematic block diagram of a digital demodulator in accordance with the present invention.

FIG. 9 is a schematic block diagram of the digital demodulator 116 that includes a baseband conversion module 130, a channel select filter 132, and a data recovery module 134. The channel select filter 132 includes a first low pass filter stage 136, a gain stage 138, a subtraction module 140, and a second low pass filter stage 142.

Figure 1:
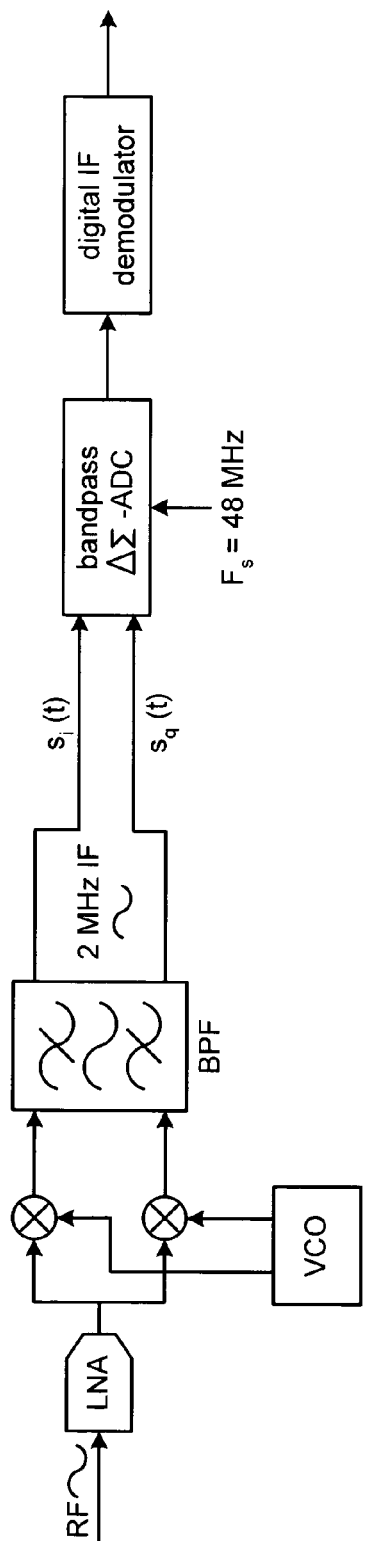
FIG. 1 is a schematic block diagram of a prior art RF receiver.
Figure 2:
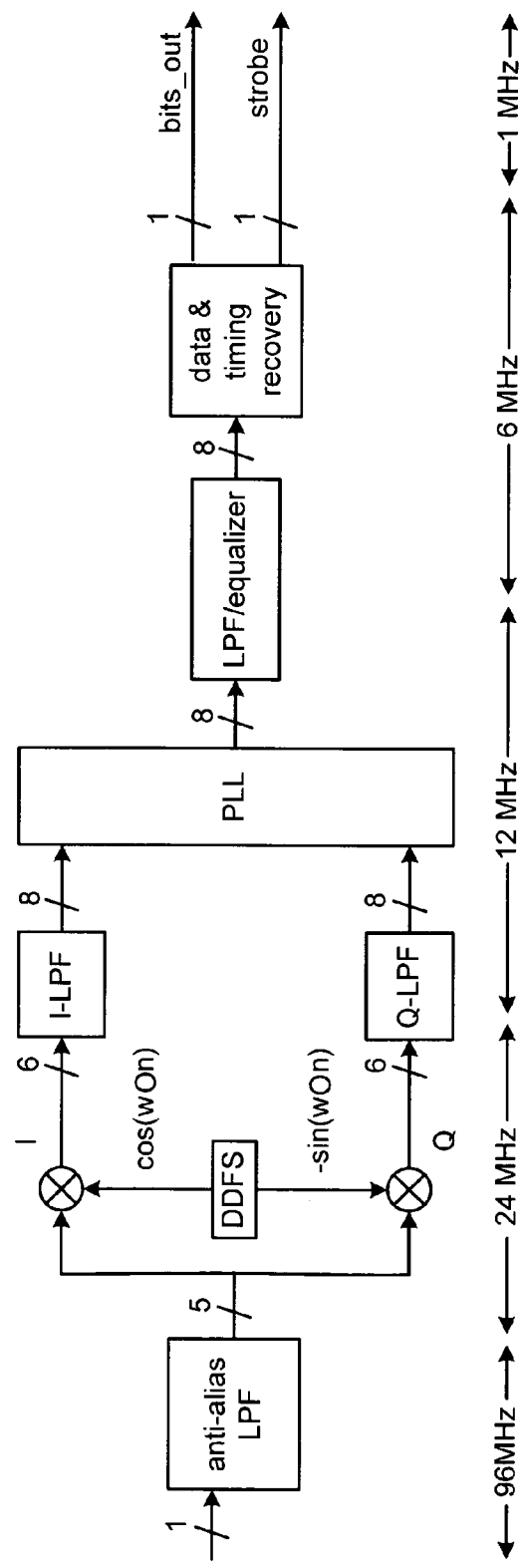
FIG. 2 is a schematic block diagram of a prior art digital IF demodulator.

In operation, the baseband conversion module 130 converts the digital low IF signals 124 into digital baseband signals 145. In one embodiment, the baseband conversion module 130 includes the anti-aliasing filter, the mixers, the DDFS, the I and Q low pass filters, and the phase locked loop of the digital demodulator of FIG. 2.

The first low pass filter stage 136 of the channel select filter 132, which will be described in various embodiments as depicted in one or more of FIGS. 10-29, filters the digital baseband signals 145 to produce first low pass filter signals 144. The gain module 138, which will be described in various embodiments as depicted in one or more of FIGS. 10-29, adjusts the gain of the digital baseband signals 145 to produce gained digital baseband (BB) signals 146.

The subtraction module 140 subtracts the first LPF signals 144 from the gained digital BB signals 146 to produce first stage signals 148. The second LPF stage 142, which will be described in various embodiments as depicted in one or more of FIGS. 10-29, filters the first stage signals 148 to produce channel selected signals 150. Such a channel select filter provides an ultra hardware efficient narrowband frequency selective low pass filter that incorporates magnitude equalization response for applications where very low power consumption and die area requirement is of concern, such as in wireless transceivers. Further, as will subsequently be described, the channel select filter 132 may be implemented using primarily adders and registers and include only one or no multipliers.

The data recovery module 134 converts the channel selected signals 150 into inbound digital symbols 92. As one of ordinary skill in the art will appreciate, the data recovery module 134 and the receiver functionality of the digital processing module 64 function in concert to recover raw data. As such, the functional boundary illustrated in the preceding figures between the two elements is primarily discussion purposes.

Figure 10:
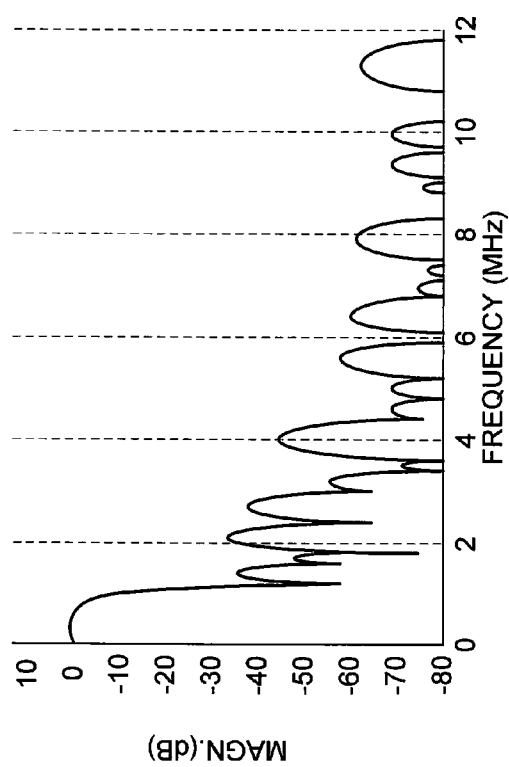
FIG. 10 is a diagram of a magnitude response of the channel selection filter in accordance with the present invention.
Figure 11:
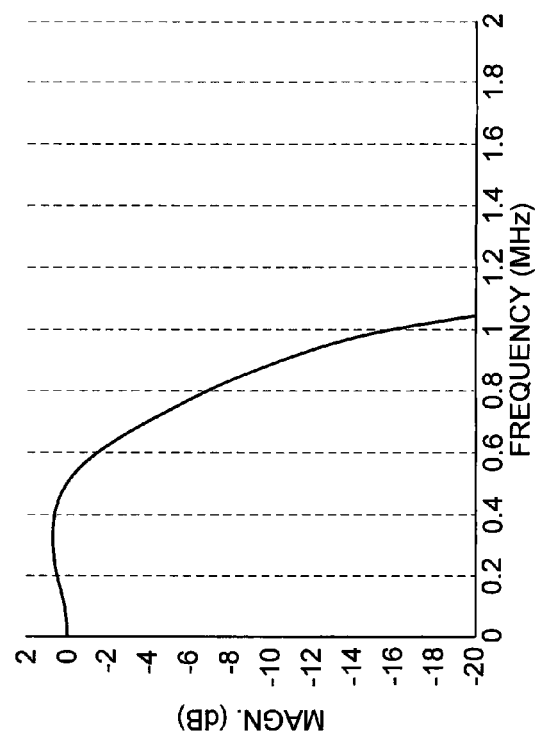
FIG. 11 is a close up diagram of the magnitude response of the channel selection filter in accordance with the present invention.

FIG. 10 a diagram of a magnitude response of the channel selection filter 132 in the frequency range of 0-12 MHz. As is shown, the magnitude response includes sharp filtering characteristics. FIG. 11 illustrates a close-up of FIG. 10 and reveals an in-band channel magnitude equalization response that counteracts the droop of the analog BPF 122 of FIG. 8. Specifically, the digital filter magnitude response has a slight upwards slope in the frequency range 0-400 kHz and then tapers off to unity at 500 kHz.

Figure 3:
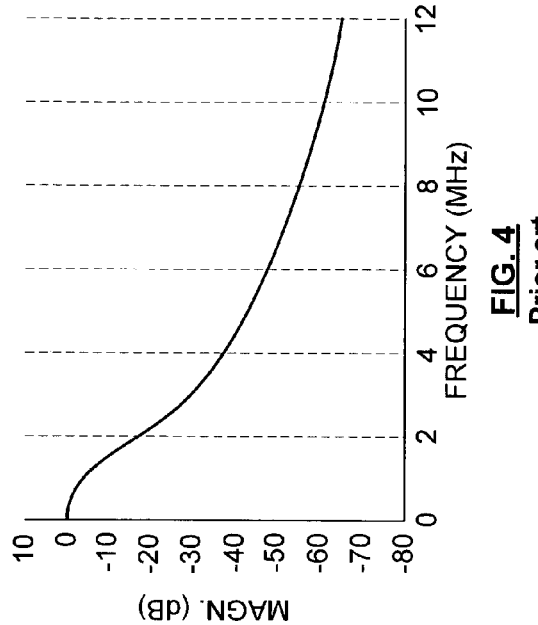
FIG. 3 is a diagram of a desired signal filtering response of the receiver of FIG. 1.
Figure 4:
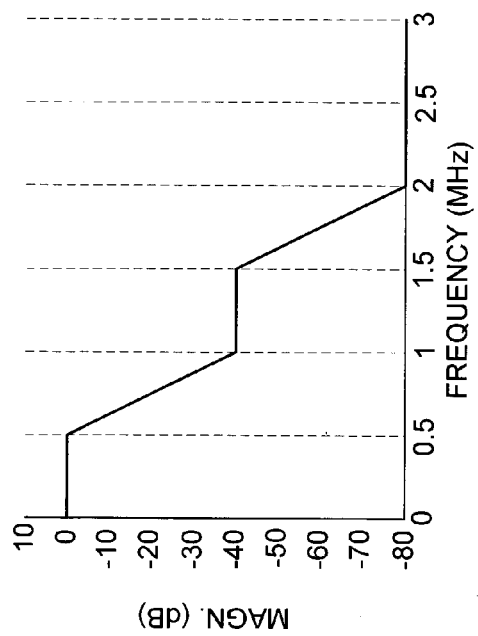
FIG. 4 is a diagram of the magnitude response of the bandpass filter of the receiver of FIG. 1.
Figure 5:
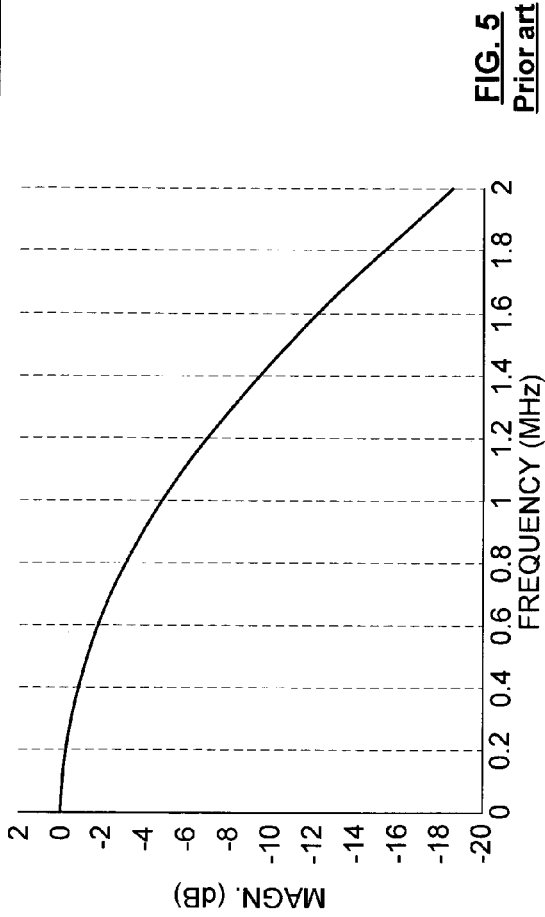
FIG. 5 is a close up diagram of the magnitude response of the bandpass filter of the receiver of FIG. 1.
Figure 12:
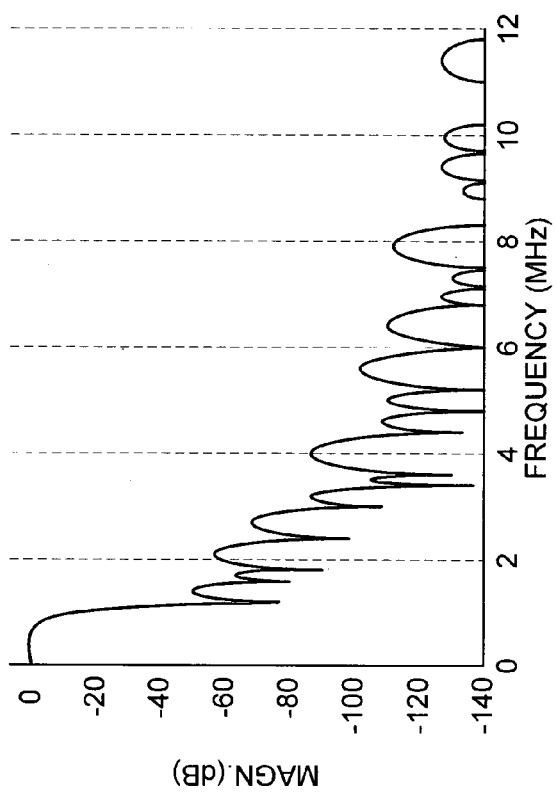
FIG. 12 is a diagram of magnitude response of the analog bandpass filter and the channel select filter in accordance with the present invention.
Figure 13:
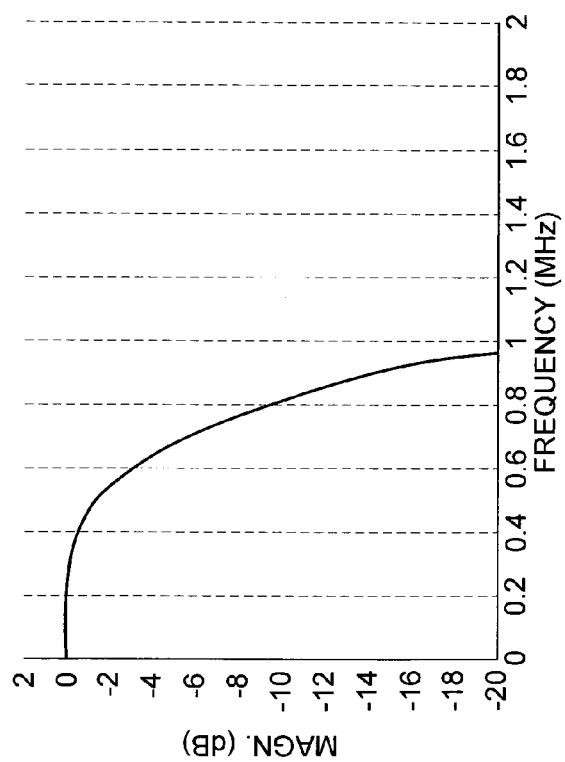
FIG. 13 is a close up diagram of the magnitude response of the analog bandpass filter and the channel select filter in accordance with the present invention.

FIGS. 12 and 13 illustrate the combined low pass equivalent magnitude response of the analog and digital channel filtering of the Bluetooth receiver. In particular, FIG. 12 illustrates a frequency selective magnitude response exceeding a typical channel filtering requirements of the Bluetooth standard shown in FIG. 3. FIG. 13 illustrates the "flattened", or "equalized", magnitude response of the combined filter response. Compared to the droopy response of the analog filter, the combined response is substantially "flatter" and thus has less detrimental effects on the receiver demodulation performance.

Figure 14:
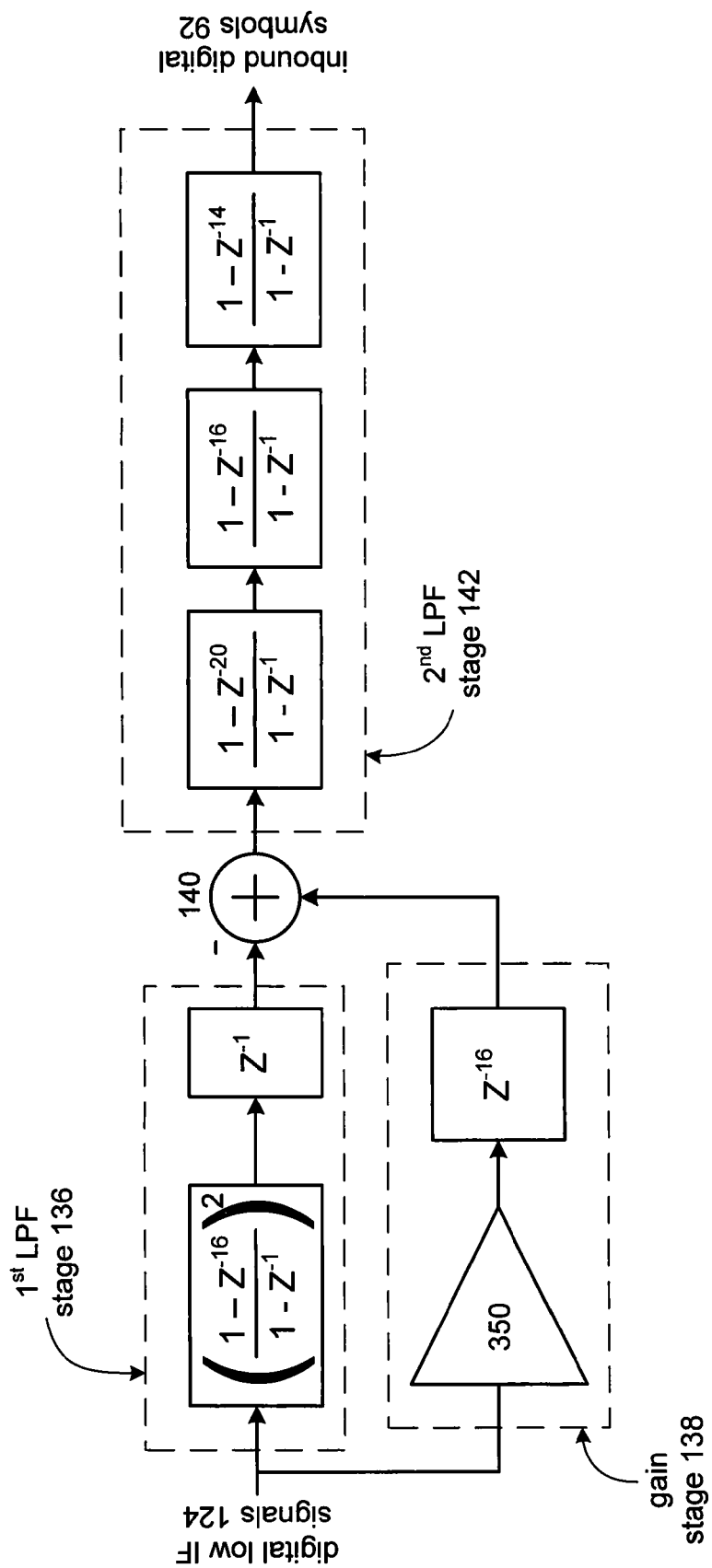
FIG. 14 is a schematic block diagram of an embodiment of a channel select filter in accordance with the present invention.

FIG. 14 illustrates details of the signal processing blocks of an embodiment of digital channel-select filter 132 that includes the first LPF stage 136, the gain stage 138, the subtraction module 140, and the second LPF stage 142. As shown, the filter 132 includes a linear combination of "comb" filters within the first and second LPF stages 136 and 142, a single multiplier, and a few delays (registers). The filter of FIG. 14 is an FIR filter and thus has linear phase response since all sub-blocks of the filter are comb-filters, i.e., filters of the form.

$$\frac{1-z^{-N}}{1-z^{-1}},$$

which, indeed, are FIR filters since $$\frac{1-z^{-N}}{1-z^{-1}} = \frac{(1-z^{-1})\sum_{i=0}^{N-1} z^{-i}}{(1-z^{-1})} = \sum_{i=0}^{N-1} z^{-i}.$$

It follows that the filter of FIG. 14 is an FIR filter since it consists of a linear combination of FIR filters.

Figure 15:
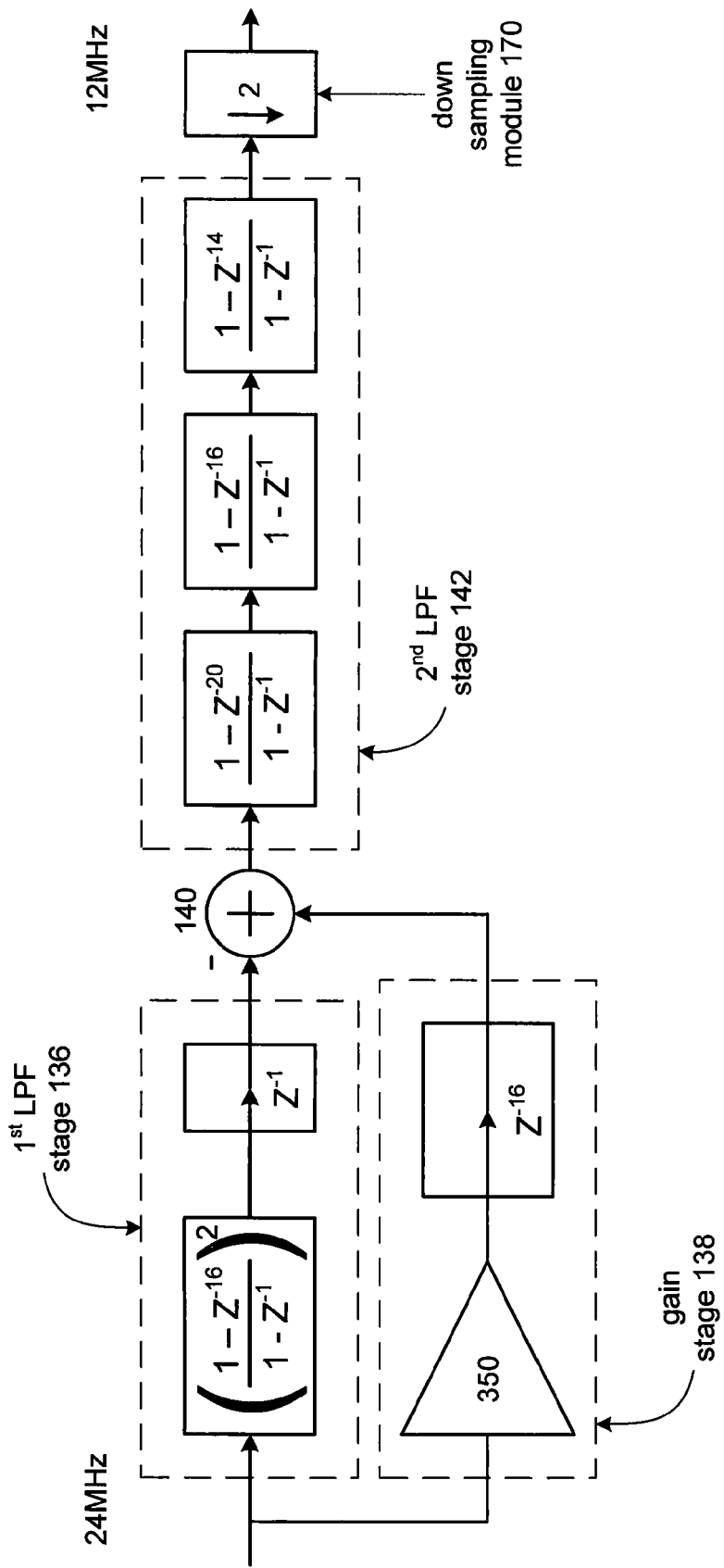
FIG. 15 is a schematic block diagram of another embodiment of a channel select filter in accordance with the present invention.

FIG. 15 illustrates a decimation filter embodiment of the channel select filter 132 that includes the blocks of FIG. 14 plus a down-sampling module 170. The down-sampling module 170 reduces the sampling rate of the digital signal. In this example, a 2-fold down-sampler is employed and the sampling rate is reduced from 24 MHz to 12 MHz by simply discarding every second sample of the filter output. For example, suppose x[n]=...3,5,1,7,8,...

The 2-fold down-sampled sequence y[n] is then y[n]=...3,1,8,...

In general, an N-fold down-sampler operating on a sequence x[n] outputs a sequence y[n] according to y[n]=x[nN].

The combined block consisting of the filter and down-sampler is referred to as a decimation filter. Typically, decimation filters are encountered often in receivers since the ADCs are typically high sampling rate devices. It is often desired to reduce the sampling rate as part of the filtering process, which reduces power consumption and complexity of the subsequent processing stages.

Figure 16:
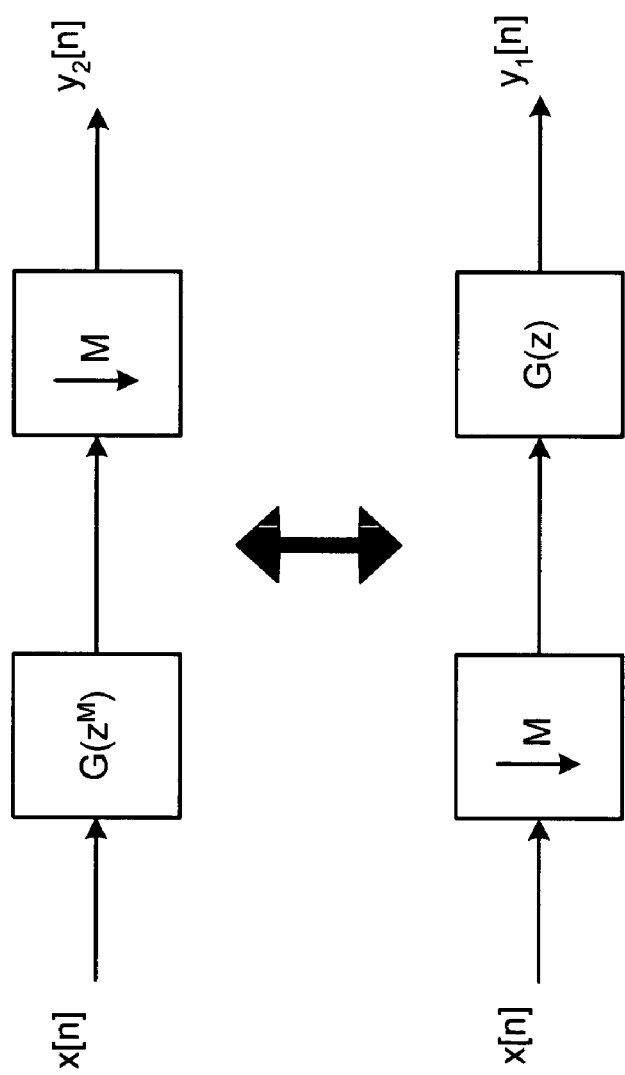
FIG. 16 is a schematic block diagram of a digital signal processing identity.

FIG. 16 functionally illustrates a Noble identity of digital signal processing identities. In general, the Noble identity illustrated states that the signal processing performed by considering a filter $G(z^N)$ followed by an N-fold down-sampler is equivalent to the signal processing performed by first down-sampling the signal and then applying the filter G(z). Thus, with reference to FIG. 16, $y_2[n]=y_1[n]$. The advantage of applying this equivalence is reduced hardware complexity of the filtering due to a reduced number of registers and reduced power consumption due to the filter operating at a lower sampling rate.

Figure 17:
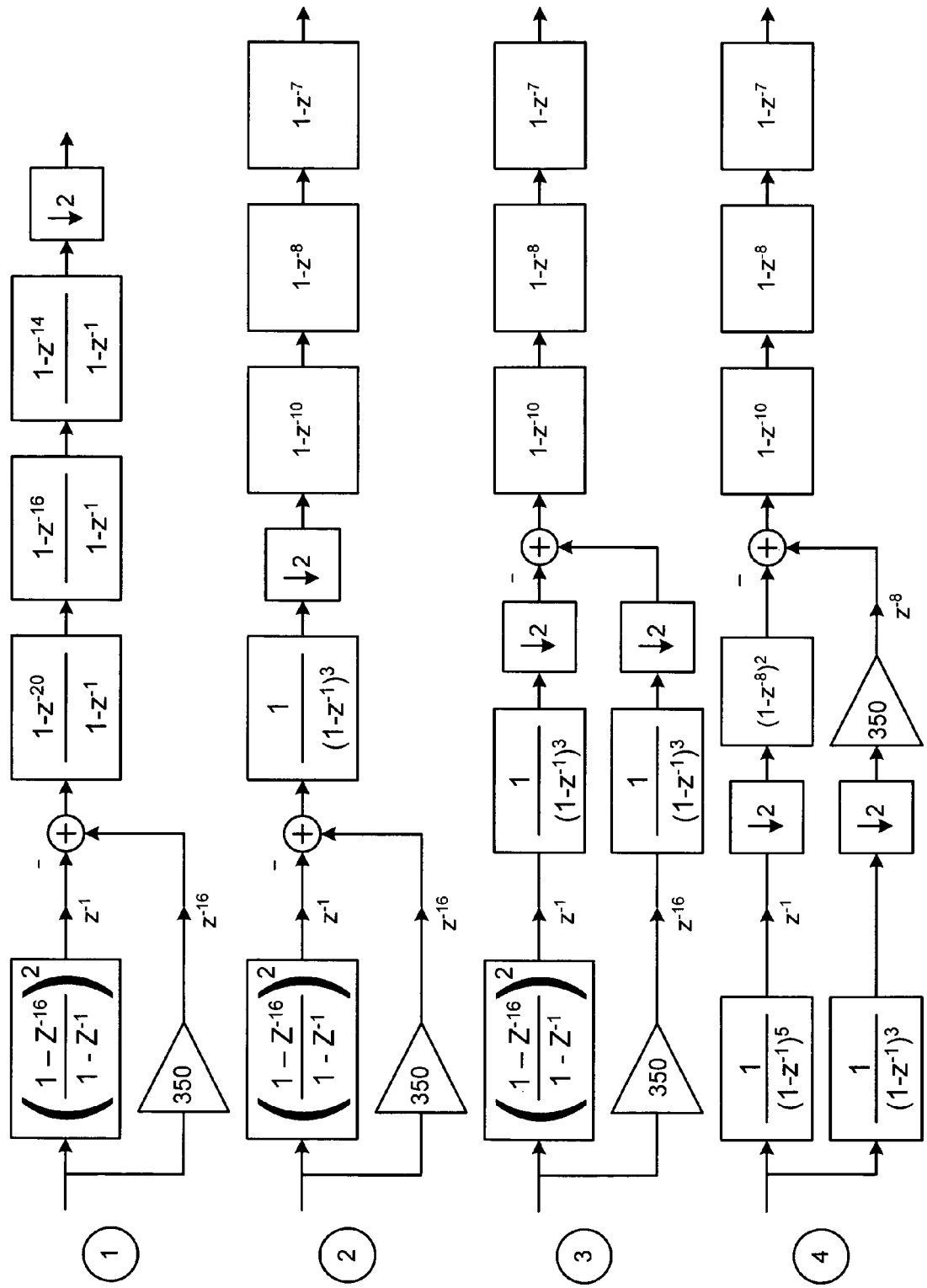
FIG. 17 is a diagram illustration simplification of a channel select filter in accordance with the present invention.

FIG. 17 illustrates a sequence of steps used to arrive at a complexity reduction of the decimation filter of FIG. 15. From step 1 to step 2, the Noble identity is applied to the three right-most comb filters. Only the numerator is a function of $z^2$, the denominator cannot be simplified using this rule.

From step 2 to step 3, the cascade of the term $$\frac{1}{(1-z^{-1})^3}$$

and the down-sampler
↓2 are moved to the left of the subtractor node. Notice that this results in both terms occurring on both branches. From step 3 to step 4, in the upper branch the Noble identity is applied to the numerator of the term $$\left(\frac{1-z^{-16}}{1-z^{-1}}\right)^2$$

and the resulting denominator terms are merged, i.e., $$\frac{1}{(1-z^{-1})^2} \times \frac{1}{(1-z^{-1})^3} = \frac{1}{(1-z^{-1})^5}.$$

In the lower branch, the cascade of the term $$\frac{1}{(1-z^{-1})^3}$$

and the down-sampler
↓2 are moved to the left of the 16-entry register bank, thereby reducing the number of registers to 8.

To proceed with the simplification, notice that the term $(1-z^{-N})$ can be implemented with N registers and a subtractor, as shown in FIG. 18. This basic structure is referred to as an "N-sample differentiator". Similarly, notice that the term.

$$\frac{1}{(1-z^{-1})}$$

can be implemented with a single register and an adder, as shown in FIG. 19. This basic structure is referred to as an "integrator". Strictly speaking, the block diagram of FIG. 19 shows the implementation of the term $$\frac{z^{-1}}{(1-z^{-1})},$$

a fact that demands careful consideration due to the branching of the filter. In digital design, this is the preferred way to implement an integrator since the delay in the forward path relaxes the timing requirements when multiple integrators are cascaded. Additional considerations hereof are given in the following.

FIG. 20 shows the implementation of the simplified form of the decimation filter shown in FIG. 17, step 4. It consists of five integrators operating at 24 MHz, five differentiators operating at 12 MHz, a multiplier, and a number of registers. The implementation shares the processing blocks of the two branches of the filter to a maximum degree as explained in the following. The signal processing path of the upper branch of the filter in FIG. 17, step 4, consists of five integrators, register, down-sampler, two 8-sample differentiators, a subtraction, a 10-sample differentiator, an 8-sample differentiator, and a 7-sample differentiator. The same processing is achieved in FIG. 20 by starting at the filter input on the left, traversing the five integrators, and following the signal path to the output. The signal processing path of the lower branch of the filter in FIG. 17, step 4, consists of consists of a gain, three integrators, down-sampler, registers, an addition, a 10-sample differentiator, an 8-sample differentiator, and a 7-sample differentiator. The same processing is achieved in FIG. 20 by starting at the filter input on the left, traversing the first three integrators, branching off to the gain block and following the signal path to the output.

Figure 21:
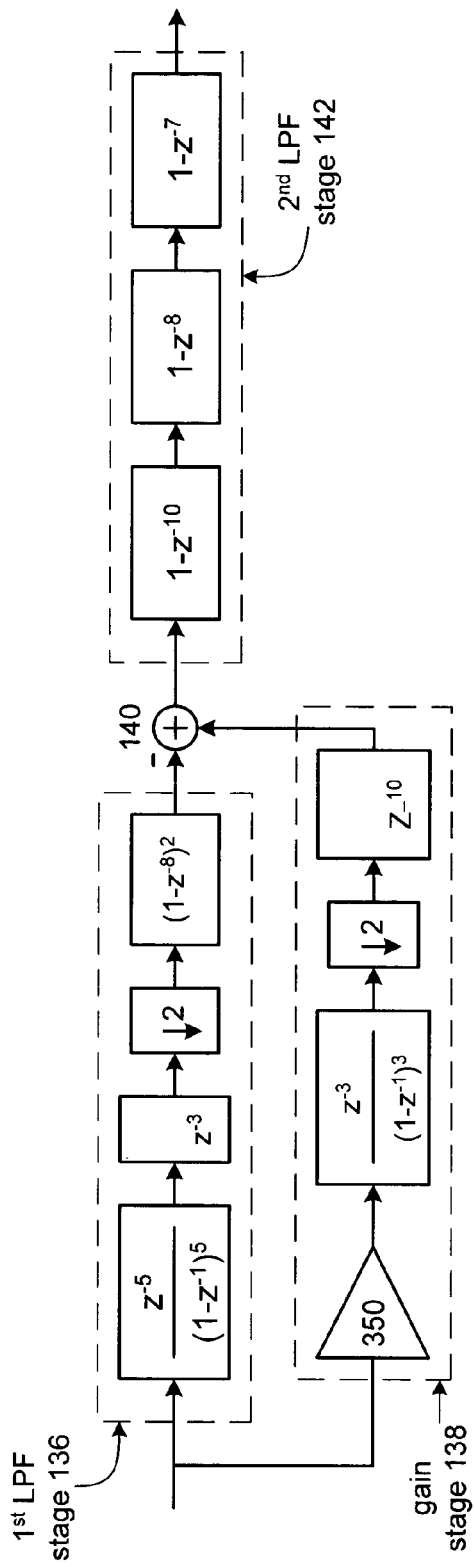
FIG. 21 is a schematic block diagram of yet another embodiment of a channel select filter in accordance with the present invention.

Notice that due to the "extra" delay in the integrators mentioned above, a few additional registers have been inserted in the paths of the filter in FIG. 20. In particular, FIG. 21 is a representation of the filter implemented in FIG. 20.

Figure 22:
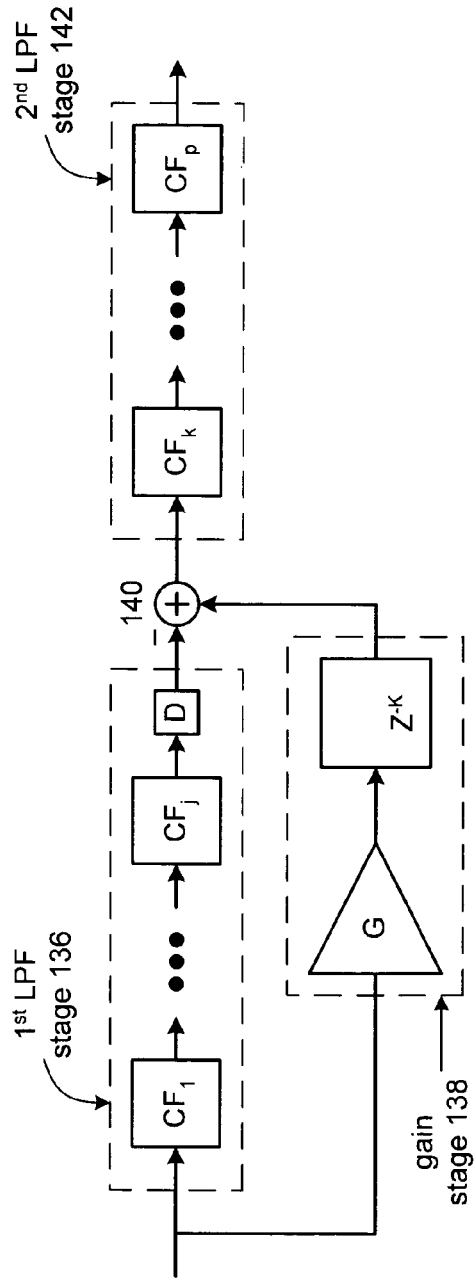
FIG. 22 is a schematic block diagram of still another embodiment of a channel select filter in accordance with the present invention.
Figure 23:
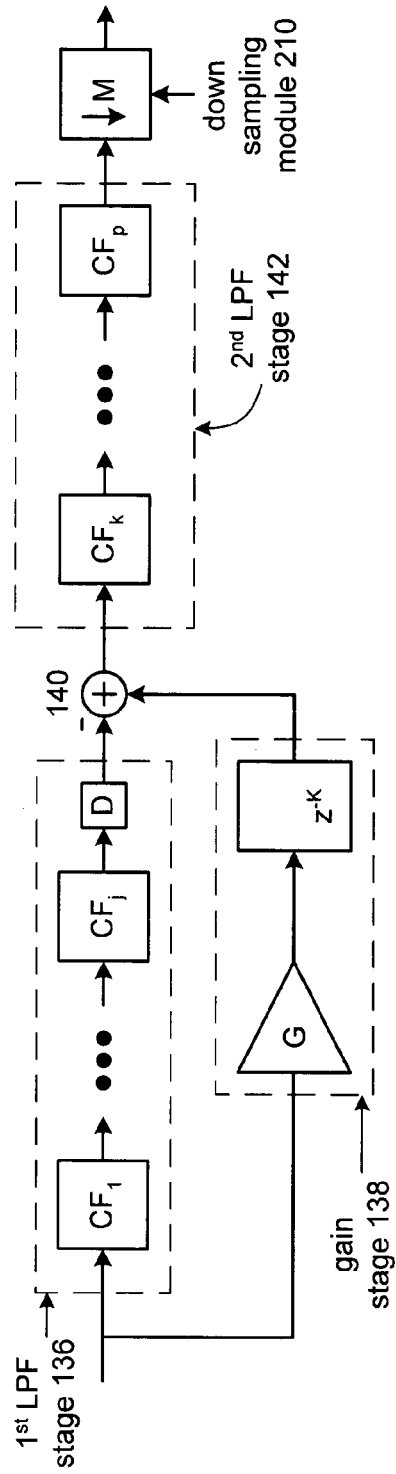
FIG. 23 is a schematic block diagram of a further embodiment of a channel select filter in accordance with the present invention.

It is clear that the technique described in the above can be applied to a variety of channel-select filter 132 designs. FIGS. 22 and 23 illustrate the general forms of the channel-select filter 132 incorporating channel magnitude equalization response. Specifically, FIG. 22 is the non-decimation version, while FIG. 23 illustrates the decimation filter version. The blocks labeled "CF" denote comb filters, the block labeled "G" is a gain factor, and the block labeled "D" represents delays, or, equivalently, registers. The specific choice of CFs, gain factor, and delays are filter design parameters and the optimal values depend upon the application. Some further examples and discussions hereof are given in the following.

Figure 24:
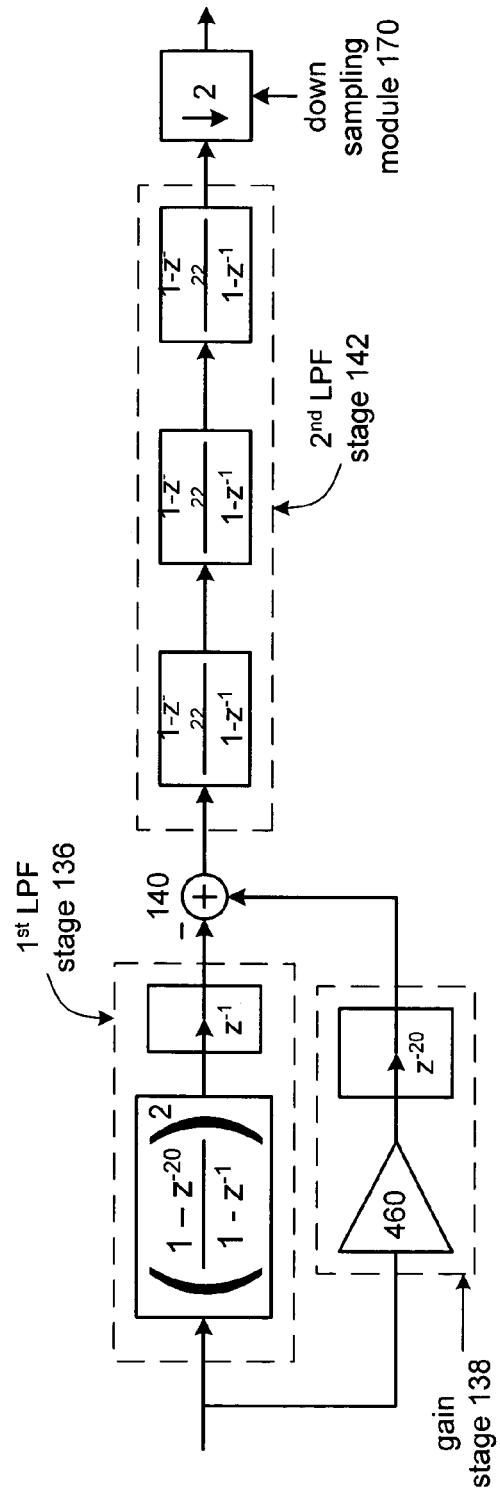
FIG. 24 is a schematic block diagram of a still further embodiment of a channel select filter in accordance with the present invention.
Figure 25:
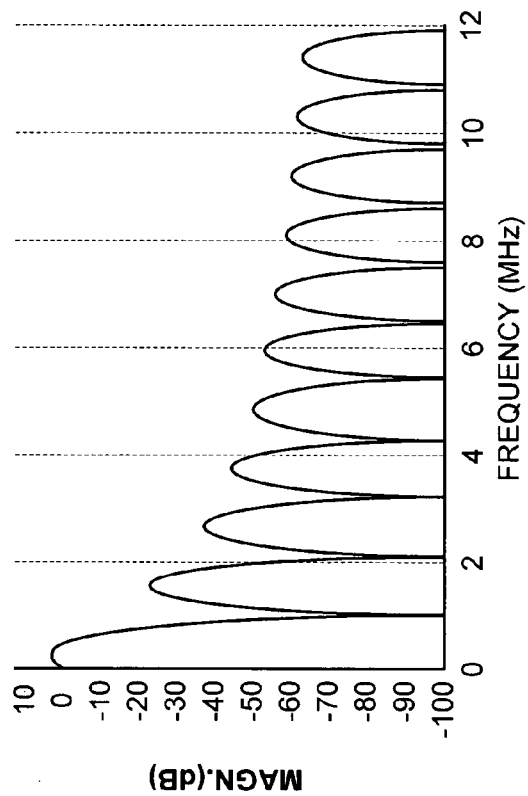
FIG. 25 is a diagram of magnitude response of the channel select filter of FIG. 24.

FIG. 24 illustrates an example decimation filter version of the channel select filter 132 where the comb filters after the subtractor are all similar. FIG. 25 shows the magnitude response of this filter. As can be seen, since the comb filters after the subtractor are similar, the filtering notches created by the combs are all coincidental. This choice of combs might be optimal for filtering well-known interferers that are known a-priori to be placed at these notch frequencies. A magnitude equalization response of about 3 dB is achieved.

Figure 26:
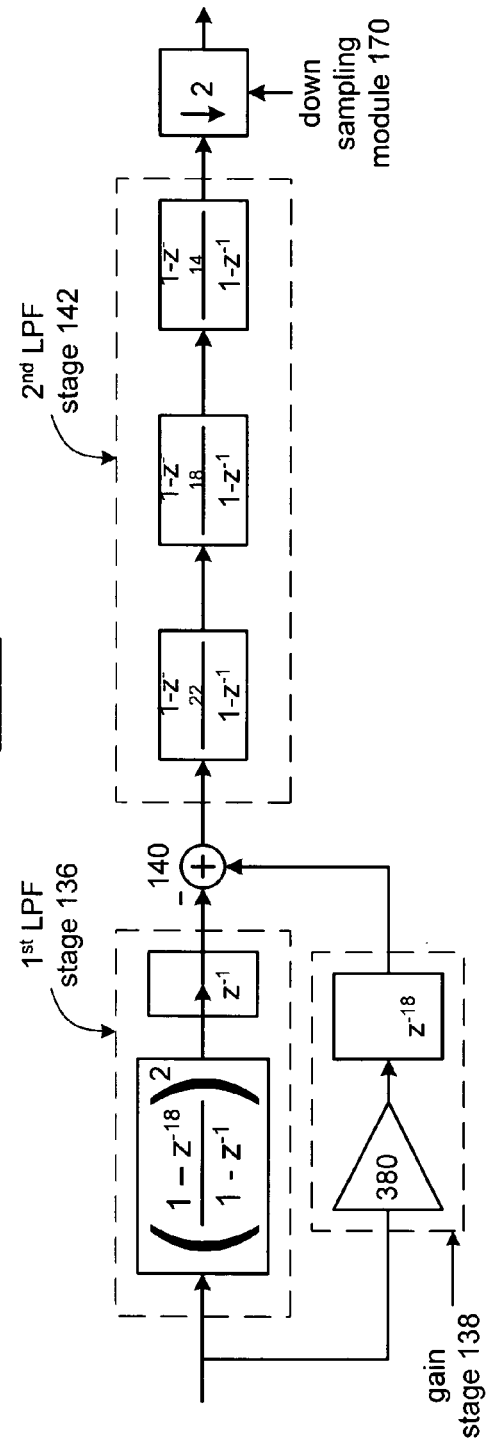
FIG. 26 is a schematic block diagram of an even further embodiment of a channel select filter in accordance with the present invention.
Figure 27:
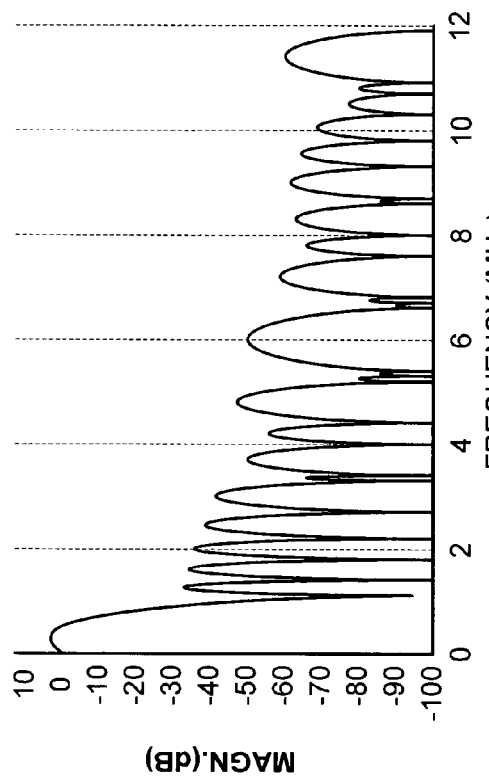
FIG. 27 is a diagram of magnitude response of the channel select filter of FIG. 26.

FIG. 26 illustrates an example decimation filter version of the channel select filter 132 where the comb filters after the subtractor are different and hence result in filtering notches that are more evenly spaced in the frequency domain. FIG. 27 shows the magnitude response of this filter. As can be seen, the filtering notches created by the combs are well spread out. This choice of combs might be optimal for filtering where interferer locations are not known a-priori and a more "even" low pass filtering is desired. Again, a magnitude equalization response of about 3 dB is achieved.

Figure 28:
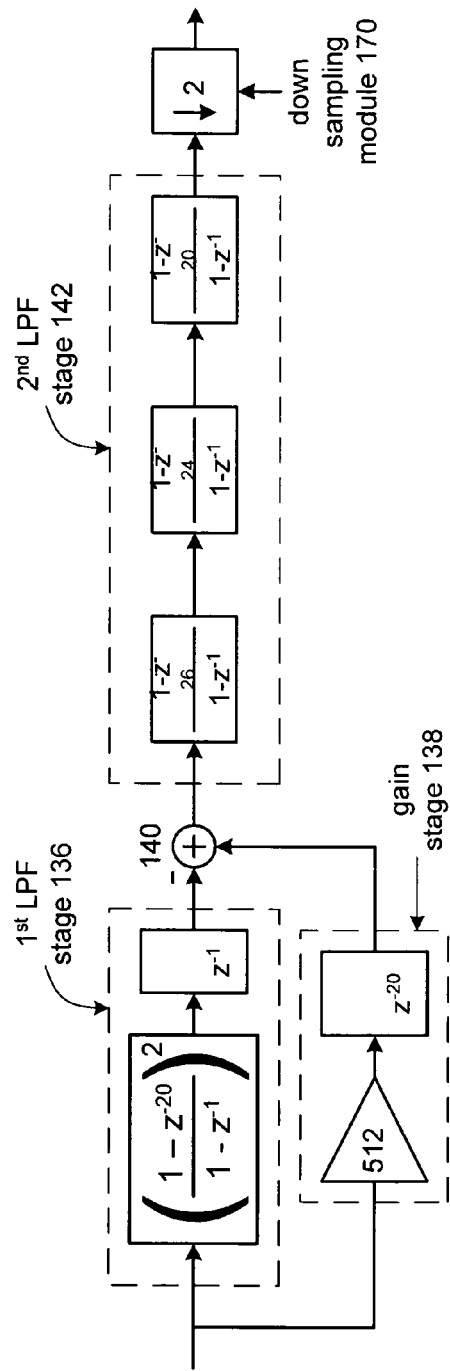
FIG. 28 is a schematic block diagram of a yet further embodiment of a channel select filter in accordance with the present invention.
Figure 29:
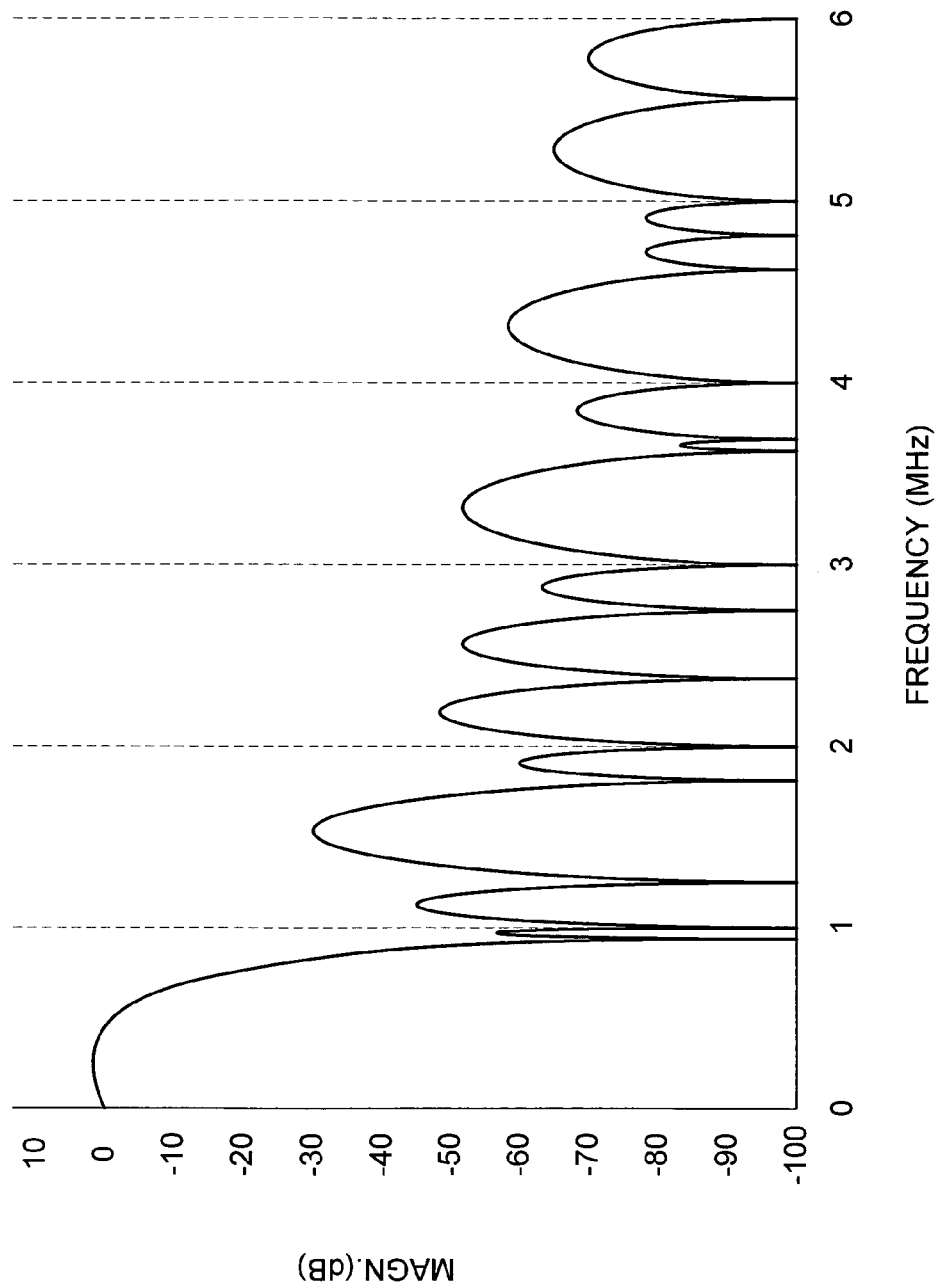
FIG. 29 is a diagram of magnitude response of the channel select filter of FIG. 28.

FIG. 28 illustrates an example decimation filter version of the channel select filter 132 where the gain factor is trivial to implement. In two's complement digital processing, implementing a gain of 512 simply involves "shifting" the number by 9 bit locations, since each shift represents a multiply-by-2. FIG. 29 shows the magnitude response of this filter.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a channel select filter and applications thereof. As one of ordinary skill in the art will appreciate, other embodiments may be derived from the teachings of the present invention without deviating from the scope of the claims.

What is claimed is:

1. A channel select filter having channel equalization, the channel select filter comprises:
   a first low pass filter stage operably coupled to filter input signals to produce first low pass filtered signals;
   a gain stage operably coupled to adjust gain of the input signals to produce gained input signals, wherein the gain stage includes:
      a gain module operably coupled to adjust magnitude of the input signals to produce magnitude adjusted input signals; and
      a delay module operably coupled to delay the magnitude adjusted input signals to produce the gained input signals, wherein level of magnitude adjustment by the gain module is at least partially based on desired response of the channel select filter;
   a subtraction module operably coupled to subtract the first low pass filtered signals from the gained input signals to produce first stage signals; and
   a second low pass filter stage operably coupled to filter the first stage signals to produce channel selected signals.

2. The channel select filter of claim 1, wherein the first low pass filter stage comprises:
   a multiple order comb filter operably coupled to filter the input signals to produce low pass filtered signals; and
   a delay module operably coupled to delay the filtered signals to produce the first low pass filtered signals.

3. The channel select filter of claim 1, wherein the first low pass filter stage comprises:
   a plurality of cascaded low pass filters operably coupled to filter the input signals to produce low pass filtered signals; and
   a delay module operably coupled to delay the filtered signals to produce the first low pass filtered signals.

4. The channel select filter of claim 3, wherein each of the plurality of cascaded low pass filters comprises a comb filter.

5. The channel select filter of claim 1, wherein the second low pass filter stage comprises at least one of:
   a multiple order comb filter; and
   a plurality of cascaded low pass filters.

6. The channel select filter of claim 5, wherein each of the plurality of cascaded low pass filters comprises a comb filter.

7. The channel select filter of claim 1 further comprises:
   a down-sampling module coupled to decimate the channel selected signals to produce down-sampled channel selected signals.

8. The channel select filter of claim 7, wherein:
   the first low pass filter stage includes a multiple order comb filter; and
   the second low pass filter stage includes a plurality of comb filters, wherein implementation of the channel select filter is simplified based on a digital signal processing identity such that the channel select filter is void of multipliers.

9. The channel select filter of claim 8, wherein the digital signal processing identity comprises a Noble identity.

10. A radio receiver comprising:
a low noise amplifier operably coupled to amplify inbound radio frequency (RF) signals to produce amplified inbound RF signals;
a down conversion module operably coupled to convert the amplified inbound RF signals into low intermediate frequency (IF) signals;
an analog to digital converter operably coupled to convert the low IF signals into digital low IF signals; and
a digital demodulator operably coupled to convert the digital low IF signals into inbound symbols, wherein the digital demodulator includes:
a baseband conversion module operably coupled to convert the digital low IF signals into digital baseband signals;
a channel select filter operably coupled to filter the digital baseband signals to produce channel selected signals; and
a data recovery module operably coupled to produce the inbound symbols from the channel selected signals, wherein the channel select filter includes:
a first low pass filter stage operably coupled to filter the digital baseband signals to produce first low pass filtered signals;
a gain stage operably coupled to adjust gain of the digital baseband signals to produce gained digital baseband signals, wherein the gain stage comprises:
a gain module operably coupled to adjust magnitude of the input signals to produce magnitude adjusted input signals; and
a delay module operably coupled to delay the magnitude adjusted input signals to produce the gained input signals, wherein level of magnitude adjustment by the gain module is at least partially based on desired response of the channel select filter;
a subtraction module operably coupled to subtract the first low pass filtered signals from the gained digital baseband signals to produce first stage signals; and
a second low pass filter stage operably coupled to filter the first stage signals to produce the channel selected signals.

11. The radio receiver of claim 10, wherein the first low pass filter stage comprises:
a multiple order comb filter operably coupled to filter the input signals to produce low pass filtered signals; and
a delay module operably coupled to delay the filtered signals to produce the first low pass filtered signals.

12. The radio receiver of claim 10, wherein the first low pass filter stage comprises:
a plurality of cascaded low pass filters operably coupled to filter the input signals to produce low pass filtered signals; and
a delay module operably coupled to delay the filtered signals to produce the first low pass filtered signals.

13. The radio receiver of claim 12, wherein each of the plurality of cascaded low pass filters comprises a comb filter.

14. The radio receiver of claim 10, wherein the second low pass filter stage comprises at least one of:
a multiple order comb filter; and
a plurality of cascaded low pass filters.

15. The radio receiver of claim 14, wherein each of the plurality of cascaded low pass filters comprises a comb filter.

16. The radio receiver of claim 10, wherein the channel select filter further comprises:
a down-sampling module coupled to decimate the channel selected signals to produce down-sampled channel selected signals.

17. The radio receiver of claim 16, wherein:
the first low pass filter stage includes a multiple order comb filter; and
the second low pass filter stage includes a plurality of comb filters, wherein implementation of the channel select filter is simplified based on a digital signal processing identity such that the channel select filter is void of multipliers.

18. The radio receiver of claim 17, wherein the digital signal processing identity comprises a Noble identity.

* * * * *